United States Patent
Dao et al.

(10) Patent No.: US 6,275,891 B1
(45) Date of Patent: Aug. 14, 2001

(54) MODULAR AND SCALABLE SYSTEM FOR SIGNAL AND MULTIMEDIA PROCESSING

(75) Inventors: Tuan Q Dao, Richardson; Pius Ng, Plano; Paul Look, Richardson, all of TX (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/257,840

(22) Filed: Feb. 25, 1999

(51) Int. Cl.$^7$ ....................................... G96F 13/00
(52) U.S. Cl. ............................. 710/132; 710/127
(58) Field of Search ................... 710/131, 132, 710/126, 129, 38, 66, 127

(56) References Cited

U.S. PATENT DOCUMENTS

| | | | |
|---|---|---|---|
| 5,249,301 | * | 9/1993 | Keryvel et al. . |
| 5,392,446 | * | 2/1995 | Tower et al. .............................. 712/11 |
| 5,408,677 | * | 4/1995 | Nogi ....................................... 712/14 |
| 5,535,406 | * | 7/1996 | Kolchinsky .............................. 712/10 |
| 5,535,408 | * | 7/1996 | Hillis ....................................... 712/16 |
| 5,701,507 | * | 12/1997 | Bonneau, Jr. et al. ......... 395/500.09 |
| 5,842,034 | * | 11/1998 | Bolstad et al. .......................... 712/11 |
| 6,101,565 | * | 8/2000 | Nishtala et al. ...................... 710/127 |
| 6,116,768 | * | 9/2000 | Guttag et al. .................... 364/716.07 |

\* cited by examiner

Primary Examiner—Paul R. Myers

(74) Attorney, Agent, or Firm—Conley Rose & Tayon

(57) ABSTRACT

A modular, scalable system architecture that includes a data traffic master for providing high-bandwidth, shared memory connections to two or more processor units. The system architecture includes an array of memory modules coupled to an array of processor units by a traffic master. Each of the memory modules is connected to the traffic master by a data channel, and each data channel includes an address path and a data path. The data channels all share a common data path bit-width. On the other hand, the processor units are each coupled to the traffic master by data busses that have address and data path widths dictated by their design. Although the address path width of a given processor unit may be unable to span the address space of the shared memory, the processor unit can nonetheless access any memory location through the use of page pointers. Further, although the data path width of a given processor unit may be too large for a single data channel to support, several data channels may be combined to provide the required data path width. The traffic master includes a processor interface port for each processor unit, and a router. The processor interface ports convert data bus address and write data signals into corresponding data channel address and write data signals, and also convert data channel read data signals into corresponding data bus read data signals. The router routes the data channel signals between the processor interface ports and the memory modules. When applied to multimedia systems with a microcontroller, one or more digital signal processors, and one or more hardware accelerators, this architecture is expected to provide a substantial increase in processing capabilities.

14 Claims, 4 Drawing Sheets

MODULAR AND SCALABLE SYSTEM FOR SIGNAL AND MULTIMEDIA PROCESSING

BACKGROUND OF THE INVENTION

1. Field of the Invention

This invention relates to the field of processing system architectures suitable for signal and multimedia processing. More specifically, this invention relates to system having a shared memory architecture which simultaneously provides high memory access bandwidth to multiple processing devices.

2. Description of the Related Art

Digital multimedia systems require a substantial digital signal processing capability. This requirement is shared by many other digital systems including image rendering systems, artificial vision systems, digital communication systems, and speech recognition systems. The typical architecture for such systems is shown in FIG. 1.

FIG. 1 shows a microcontroller bus 102 which couples a microcontroller 104 to a microcontroller memory 106. A digital signal processor (DSP) 108 is similarly coupled to a DSP memory 110 by a DSP bus 112. The two busses are coupled by a bus bridge 114.

This architecture is popular since the microcontroller 104 can assume the responsibility for system-level functions (such as controlling a user interface, initiating and terminating operation of various system modules, and coordinating data transfers), and the DSP 108 can assume the responsibility for computationally-intensive tasks (such as various coding and compression algorithms, filtering operations, and data transforms). This division of labor provides eases system design and programming.

However, this architecture is inadequate for future generations of digital multimedia systems. The processing requirements are being increased as designers take advantage of compression algorithms and higher bandwidths to transmit more information. To keep pace, this architecture requires a more powerful DSP.

A more powerful DSP can be created in two ways. The clock speed can be increased, but this requires careful optimization and redesign of the DSP for every incremental improvement in semiconductor processing technology. Alternatively, the DSP can be provided with wider data paths, e.g. an 8-bit DSP could be replaced with a 32-bit DSP. However, the increases in the required area and power consumption are quadratic (i.e. to double the data path width, the area and power requirements increase by approximately a factor of four). This alternative is undesirable since power consumption is a perennial design constraint, particularly in view of the increasing popularity of portable devices.

Furthermore, larger data path widths are likely to be a poor "fit" for the data granularity, leading to inefficient use of the more powerful DSPs. For example, MPEG video compression operates on 8-bit blocks of video data. Even if multiple blocks were retrieved at a time, the DSP could only perform (at most) one 8-bit block operation per clock cycle. The rest of the data path width is unused for these operations.

To address these problems, this architecture may be modified by the addition of a dedicated hardware accelerator that is custom-designed to efficiently and quickly carry out specific algorithms. The hardware accelerator may be coupled to the DSP 108 and the DSP memory 110 via the DSP bus 112. The DSP 108 then performs the less demanding computationally-intensive tasks of pre-processing and post-processing the data, and allows the hardware accelerator to perform the processing steps that the DSP 108 is too inefficient to perform.

If the hardware accelerator includes its own memory buffer, then direct memory transfers may be used to move the data across bus 112. This represents undesirable power consumption, but the alternative is to require that the DSP bus 112 provide a high bandwidth connection between the hardware accelerator and DSP memory 110. This alternative presents a memory contention issue that practically requires the DSP 108 to halt whenever the hardware accelerator is operating.

Various work-arounds may be designed, such as additional memories or additional busses, but these may be expected to result in complex, custom-designed interfaces between the hardware accelerator and the DSP, and many limitations or liabilities of the DSP 108 (such as insufficient address space) may be difficult for the hardware accelerator to overcome.

Accordingly, it is desirable to have an architecture that provides modularity and support for high-bandwidth memory connections for each processor element in the system. Such an architecture would preferably provide a shared memory to minimize power consumption, and yet be scalable so as to support multiple processor elements.

SUMMARY OF THE INVENTION

The problems outlined above are addressed by a modular, scalable system architecture that includes a traffic master for providing high-bandwidth, shared memory connections to two or more processor units. In one embodiment, the system architecture includes an array of memory modules coupled to an array of processor units by a traffic master. Each of the memory modules is connected to the traffic master by a data channel, and each data channel includes an address path and one or more data paths. The data channels all share a common data path bit-width. On the other hand, the processor units are each coupled to the traffic master by a data bus that has address and data path widths which are dictated by the design of the processor unit. Although the address path width of a given processor unit may be unable to span the address space of the shared memory, the processor unit can nonetheless access any memory location through the use of page pointers. Further, although the data path width of a given processor unit may be too large for a single data channel to support, several data channels may be combined to provide the required data path width. The traffic master includes a processor interface port for each processor, and a router. The processor interface ports convert address and write data signals from a data bus into corresponding address and write data signals for one or more data channels, and also convert read data signals from the data channels into corresponding read data signals for the data bus. The router routes the data channel signals between the processor interface ports and the memory modules. When applied to multimedia systems with a microcontroller, one or more digital signal processors, and one or more hardware accelerators, this architecture is expected to provide a substantial increase in processing capabilities which can be maintained under power consumption constraints and which will be enhanced as semiconductor technologies continue to improve.

BRIEF DESCRIPTION OF THE DRAWINGS

A better understanding of the present invention can be obtained when the following detailed description of the preferred embodiment is considered in conjunction with the following drawings, in which.

Figure 1:
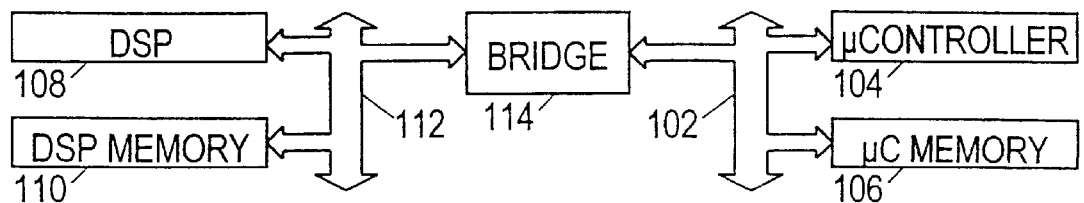
FIG. 1 shows a conventional system architecture for a multimedia device with a digital signal processing subsystem.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Figure 2:
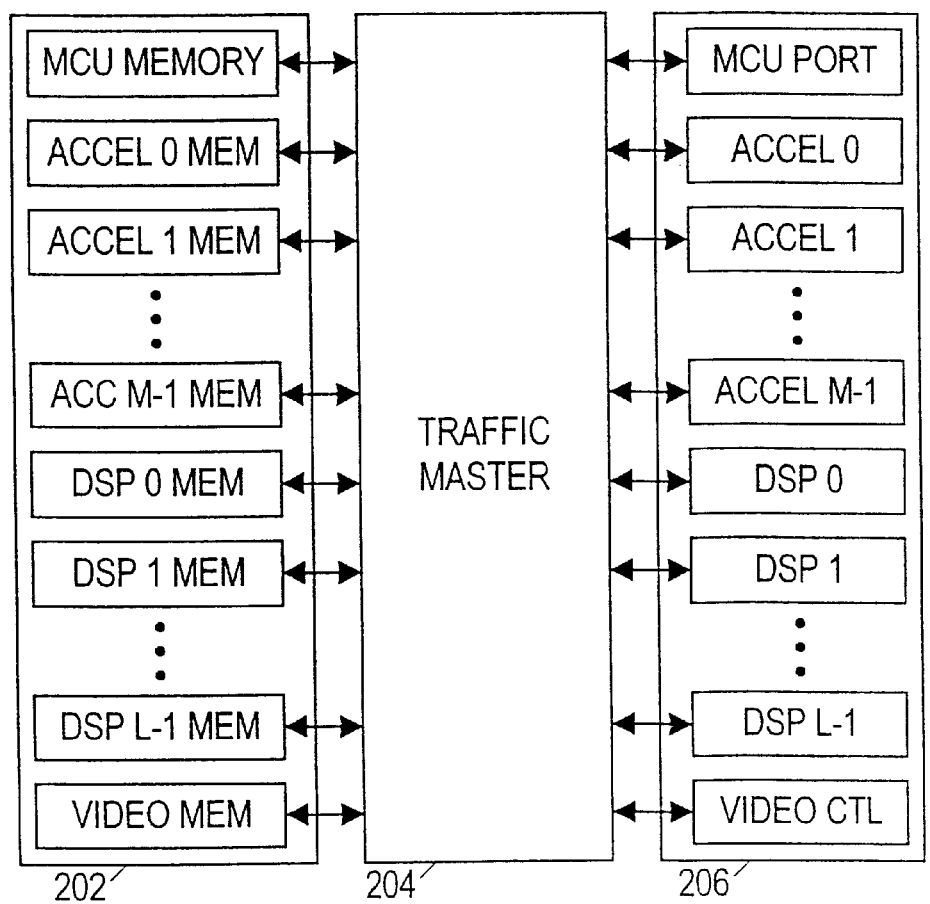
FIG. 2 is shows a system architecture according to the present invention.

FIG. 2 shows a modular, scalable, shared-memory architecture that supports high-bandwidth memory connections for each processor element in the system, and that is suitable for systems employing one or more digital signal processors and hardware accelerators. As will be apparent after reading the following disclosure, systems employing this architecture are advantageously easy to design, program, and can be customized to various system design constraints such as power consumption, performance, and re-use of existing modules.

The architecture as shown in FIG. 2 includes three portions. a memory portion 202, a data transfer portion (traffic master) 204, and a processor portion 206. Memory portion 202 is an array of memory units each coupled to the traffic master 204 by address, data, and control lines.

The memory units preferably receive enable, read, and write control signals on the control lines, and respond in the standard manner. In other words, an enabled read operation causes a memory unit to provide on the data lines read data from a memory location identified by the address signals. An enabled write operation causes a memory module to store data from the data lines in a memory location identified by the address signals. When the memory unit is not enabled, it takes no action.

The memory units preferably consist of memory modules that have a common data width, preferably eight bits. Memory modules may be combined to form a "memory unit" where greater data widths are needed. The depth (number of storage locations) of the memory modules may vary between memory units. Each memory module preferably has a read port and a write port. Such a memory module can be implemented using a time-multiplexed single port memory. In other words, a memory which supports only one access at a time (a single port memory) can be clocked at twice the system clock and the accesses alternated between read and write operations. This is not a fundamental requirement of the architecture, and other embodiments including single port memory modules and multi-port memory modules (memory modules which support multiple simultaneous read/write accesses) are discussed further below.

It is noted that the design of the memory modules may be determined independently of the design and arrangement of the data transfer portion 204 and the processor portion 206. The traffic master 204 provides a standardized interface to which the memory modules may be coupled.

Traffic master 204 independently coordinates all inter-processor, inter-memory, and processor-memory communications. The structure of traffic master 204 is discussed further below. However, it is noted here that the traffic master operates to organize the memory portion 202 into a shared memory which is wholly accessible (subject to programmable memory protection settings) to each processor unit. The processor units are each assigned ownership of a memory "page" (the size of each memory page is individually configurable), and access to memory pages owned by other processor units may be obtained by a given processor unit by setting the given processor unit's page pointer to point to the desired memory page. Memory addresses from a processor unit are treated as offset addresses from the address indicated by the processor unit's page pointer.

It is noted that using a shared memory largely eliminates the need for block transfers of memory (block transfers may still be desired, e.g. for creating multiple copies of data). This is expected to provide advantages to the system in terms of reduced power consumption and increased memory bandwidth. It is further noted that the use of page pointers eliminates any memory size limitations that the fixed width of a processor unit's address path might otherwise impose. This allows a system to be scaled as needed without any redesign of the processor units.

Processor portion 206 is an array of two or more processor units. The processor units may be of various types such as a digital signal processor (DSP), a hardware accelerator (denoted "ACCEL" in the figures), a video controller, a microcontroller unit (MCU), or an interface port to a system including any one of these. The traffic master 204 preferably provides a standard memory-type interface for coupling to the processor units. In other words, the processor units are coupled to the traffic master 204 by control lines, address lines, and data lines. The processor units preferably provide enable, read, and write signals on the control lines, and receive a "ready" signal on one of the control lines.

To send data, a processor unit provides an address on the address lines and data on the data lines, and asserts the enable signal. The traffic master 204 transfers the data and asserts the ready signal when it is ready for any subsequent data transfer operation. To receive data, a processor unit provides an address on the address lines, asserts the enable signal, and waits for an assertion of the ready signal. The traffic master 204 retrieves the data and provides the data on the data lines, then asserts the ready signal to indicate that the data is available. It is noted that the design of the processor units is determined independently of the design and arrangement of other processor units, the traffic master 204, and the memory portion 202.

Figure 3:
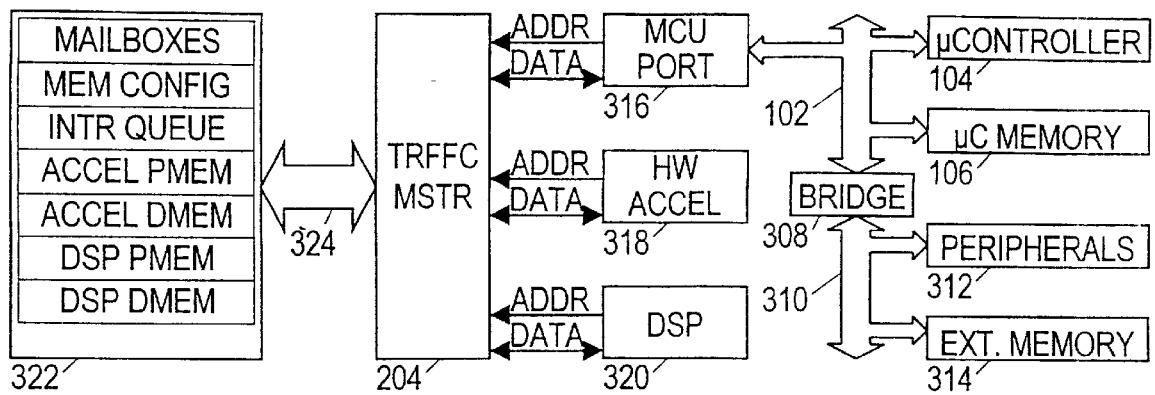
FIG. 3 is a functional block diagram of a multimedia device having an architecture according to the present invention.

FIG. 3 shows a functional block diagram of a system that illustratively employs the present architecture. The system includes a microcontroller bus 102 which couples a microcontroller unit 104 to a microcontroller memory 106 and a bus bridge 308. Bus bridge 308 couples microcontroller bus 102 to a peripheral bus 310, whereby the microcontroller 104 can access peripheral devices 312 and extended memory 314. Peripheral devices 312 preferably provide an interface to the external environment whereby the microcontroller unit 104 can obtain input data and instructions and can provide output results. Extended memory 314 preferably provides long term program and data storage when the system is powered down.

Coupled to the microcontroller bus 102 is a microcontroller unit (MCU) port 316, whereby the microcontroller 104 may communicate with the numerical processing subsystem. A traffic master 204 is coupled to the MCU port 316 and various special purpose processors such as a hardware accelerator 318 and a digital signal processor (DSP) 320. Traffic master 204 coordinates data transfers between the array of processors (including the microcontroller 104 via MCU port 316) and a logically-mapped shared memory 322 via data path 324. Traffic master 204 handles memory-to-memory, memory-to-processor, processor-to-memory, and processor-to-processor data transfers.

Shared memory block 322 represents the logical map of the memory address space as it appears to the processors. The shared memory is preferably used to store program instructions (PMEM) and data (DMEM) for each of the processors, as well as mailbox information (for interprocessor communication), memory configuration information, and interrupt queue information. The memory is divided into pages, with ownership, reading, writing, and execution privileges of each processor for each page being assigned in the memory configuration information. Subject to these programmed privileges, the traffic master 204 allows every processor to read or write from any of the memory pages. The traffic master 204 maintains a list of page pointers, one for each processor. The individual processors gain access to the various memory pages by setting their page pointers accordingly. The traffic master 204 treats subsequently generated addresses as offsets from the page pointer. One exception to this is that the first memory page (which includes the page pointers and other memory configuration information) is always accessible to each of the processors. Consequently, certain addresses generated by the processors always refer to the first memory page, regardless of the page pointer setting.

It is noted that logically-mapped shared memory 322 and data path 324 are conceptual representations provided for explanatory purposes, and are not necessarily present as physical circuits in an implemented system. Rather, the shared memory 322 is preferably implemented partially as registers (for memory configuration and the interrupt queue) and partially as separate, strategically placed memory modules of various sizes. Data path 324 preferably comprises a plurality of uniform-width address and data busses which can be dynamically configured to operate cooperatively as one or more memory busses of various sizes as needed.

In a preferred embodiment, the program instructions for each of the processor units are kept in memory 202. In an alternate embodiment, the program instructions may be kept in dedicated memories coupled directly to the processor units. Other embodiments exist which employ some combination of this.

Figure 4:
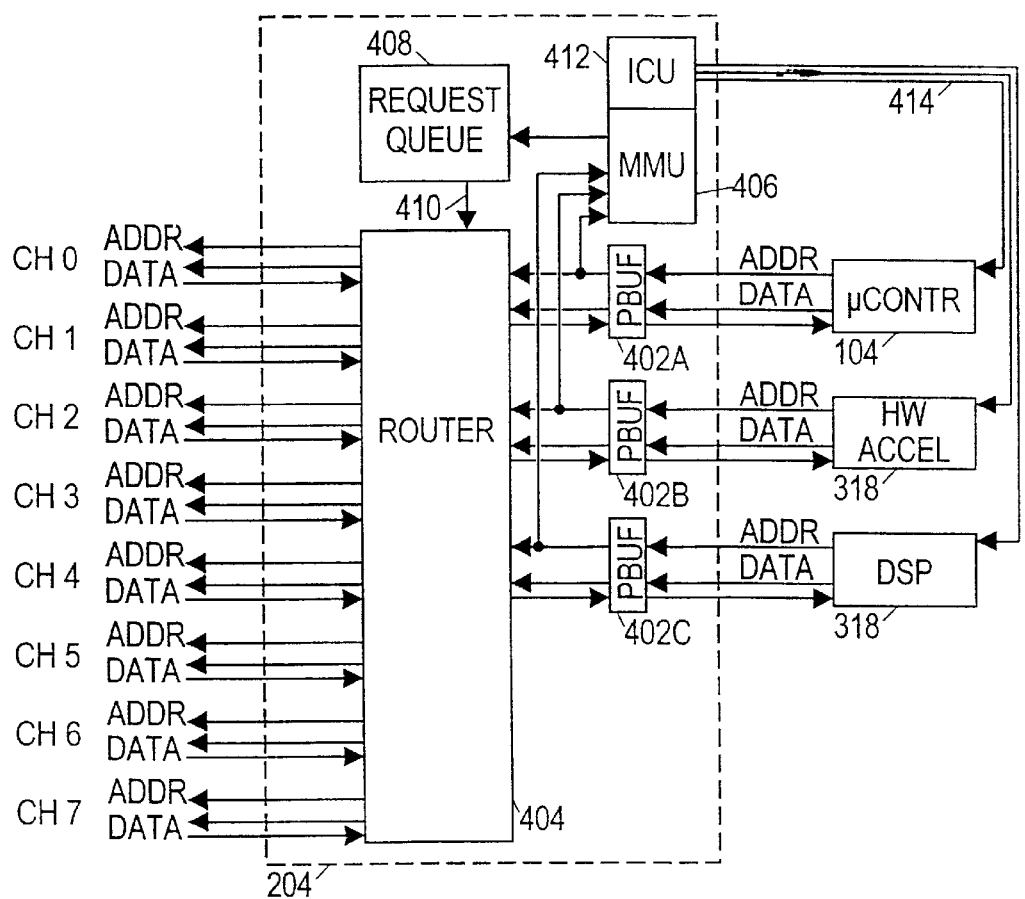
FIG. 4 is a functional block diagram of a traffic master.

FIG. 4 shows an exemplary embodiment of traffic master 204. Traffic master 204 preferably comprises port buffer logic 402 for latching address and write data signals from the processors and for driving control and read data signals to the processors. The port buffer logic 402 may additionally provide timing synchronization, control signal generation, and multiplexing/de-multiplexing functions, as necessary.

Port buffer logic 402 couples the address and data signals from processors 104 (via MCU port 316), 318, and 320, to router 404, and also provides the address signals to memory management unit (MMU) 406. The memory management unit 406 processes the addresses in conjunction with the page pointers to determine the memory module accesses being attempted by the processors. The MMU 406 resolves any conflicts (by delaying access attempts blocked by higher-priority accesses) and places conflict-free access patterns in the request queue 408. Request queue 408 may operate in first-in-first-out (FIFO) fashion. In any case, request queue 408 applies a complete, conflict-free access pattern 410 to router 404. The access pattern 410 sets switches in router 404 to route the address and data signals from the port buffer logic 402 to the data channels (CH0–CH7).

The data channels each include an address path and a bi-directional data path. In one specific implementation, the bidirectional data patch is implemented as two unidirectional data paths (a read data path and a write data path). The data channels each have a uniform data path width of (preferably) eight bits. In an alternative embodiment, the width of the data channel data path is the greatest common divisor (GCD) of the data path widths of the processor unit busses. The data channels may be combined in various configurations to provide larger data path widths, e.g. the DSP 320 may write a 32-bit word to memory using 4 data channels, at the same time the hardware accelerator writes a 24-bit word to memory using 3 data channels. When single-port memories are used, each data channel corresponds to a single memory module. The address paths of the channels may or may not be of uniform width. In a preferred embodiment, the data channels' address path widths are customized to the size of the associated memory modules.

In addition to the data channels, the router 404 can route address and data signals to registers in the memory management unit 406. These registers include page pointers and memory configuration information, and preferably include mailbox registers and a block transfer queue. Processors modify their page pointers by writing to the page pointer registers. The MMU registers are part of the logically mapped memory space, i.e. to the processors, these registers appear as part of the memory. The processors can read or write to the MMU registers just as they would to any other memory address.

The MMU also maintains a memory configuration table that tracks such things as read, write, and execute permissions of each processor for each memory page. The start address and size of the memory pages are preferably also tracked by the MMU.

Traffic master 204 also preferably includes an interrupt control unit (ICU) 412 which provides interrupt signals 414 to each of the processors. The interrupts may be used for block transfers, mailbox messages, memory protection violations, etc. Processors can initiate block transfers of data by writing a block transfer request to the block transfer queue. The MMU 406 will then handle the address generation and routing for block transfers of data. The ICU 412 asserts an interrupt to the block transfer requester to notify the requestor of the completion of the transfer.

Processors can communicate by writing mailbox messages to other processors. After detecting the mailbox message, the MMU 406 can have the ICU 412 assert an interrupt to notify the addressee of the message's existence.

If the MMU 406 detects the DSP writing to the hardware accelerator's memory page without programmed write permission, the MMU 406 can have the ICU 412 assert an interrupt to alert one of the processors of the memory protection violation.

It is expected that MMU 406 will have a relatively uncomplicated (and therefore fast) implementation much simpler than a typical general purpose memory controller for a shared memory system. Each processor's accesses to its own memory pages are expected to incur no latency (i.e. read data is received on the first clock cycle subsequent to the clock cycle in which the address is provided), while only a minimal latency may be incurred by accesses to other memory pages.

Although this embodiment shows eight data channels and three processors, and the data channels are described as having eight bit data path widths, these numbers are not intended to be limiting in any way. Rather, the architecture is intended to be general, and is capable of being embodied in a wide variety of implementations, many having more channels and processors, and perhaps larger data path widths. The memory modules may be multi-ported, in which case more data channels are expected to be associated with each memory module.

Figure 5:
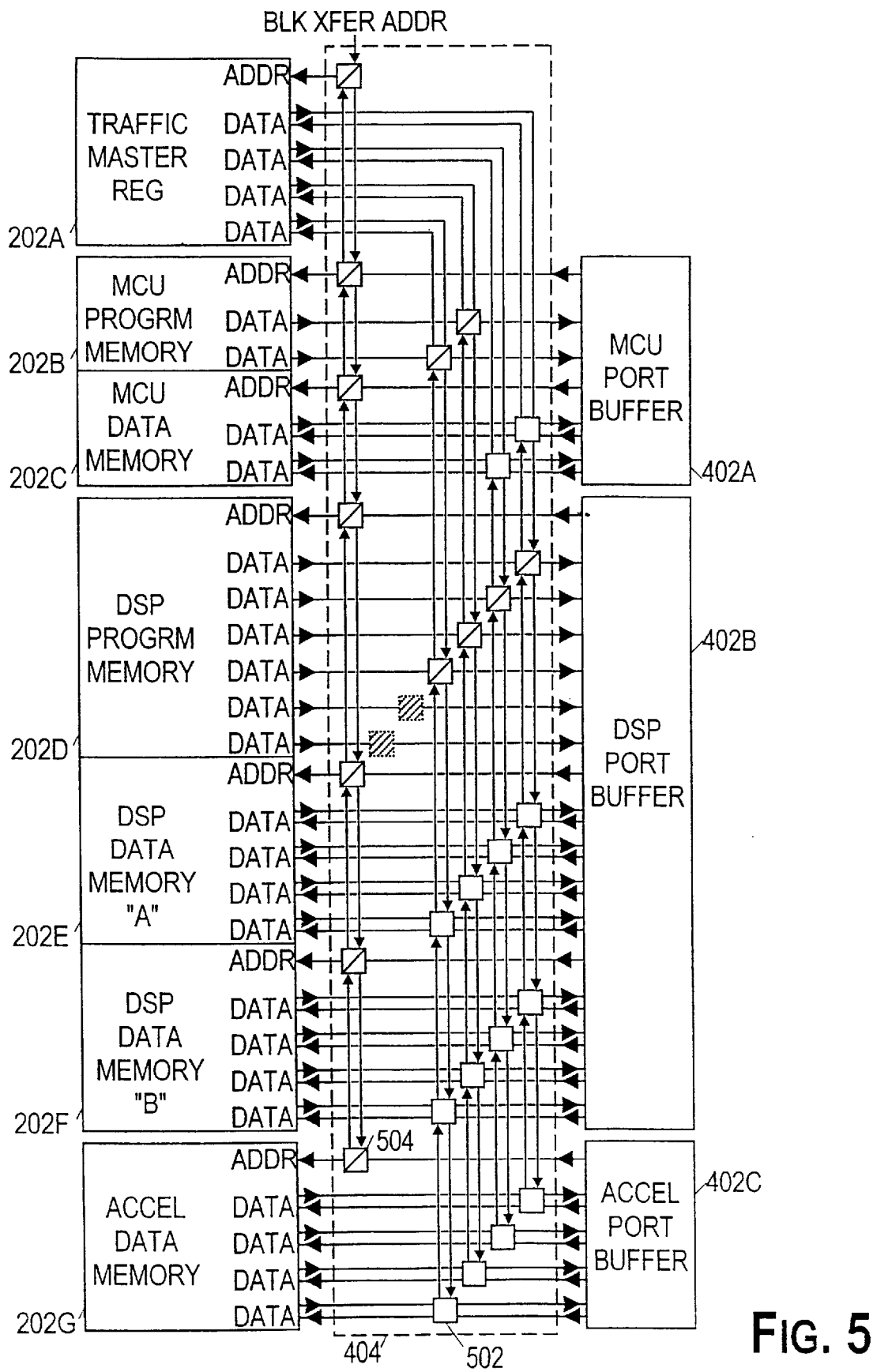
FIG. 5 shows an illustrative embodiment of a router.

FIG. 5 shows an exemplary implementation of router 404 which includes bi-directional bus bridges 502, and unidirectional bus bridges 504, both of which are controlled by access pattern control signals 410 (FIG. 4) from request queue 408. Address signals generated by the microcontroller unit for block transfers enter on the address cross-path at the top of the figure.

The read and write data paths preferably have eight-bit widths, as do the data cross-paths. Each of the bi-directional data paths are coupled to both of the data cross-paths by bi-directional bus bridges 502, while each of the address paths and unidirectional data paths are coupled to both cross-paths by uni-directional bus bridges 504. Two bus bridges are shown in broken outline—these bridges would couple to additional cross-paths if there were another 6-byte data bus in the system. In this system, they are unnecessary.

Figure 6:
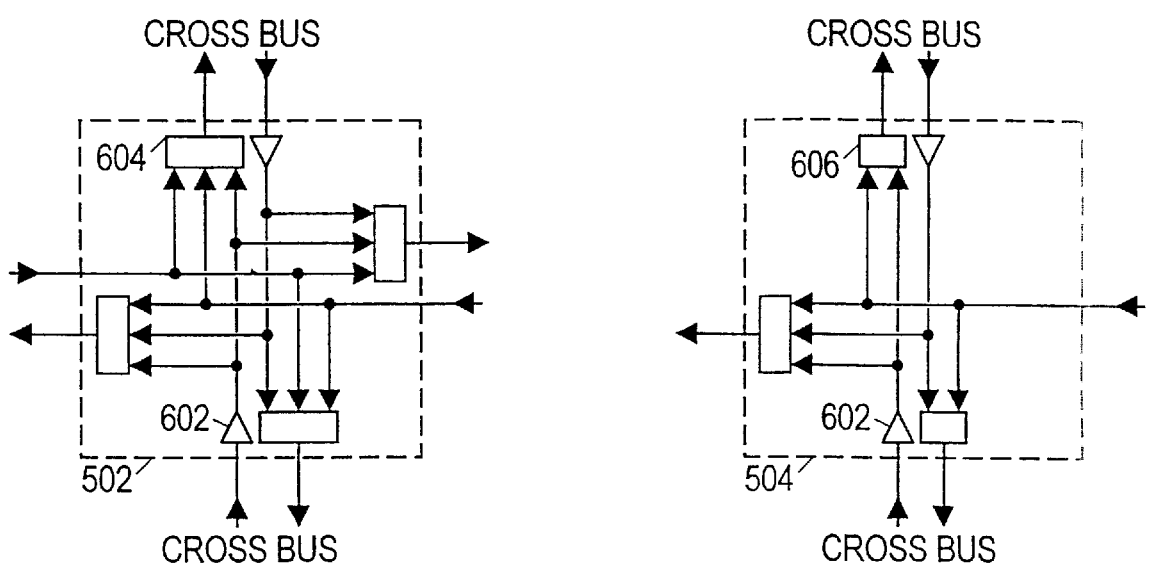
FIG. 6 shows two bus bridge embodiments.

Preferred embodiments for bridges 502, 504 are shown in FIG. 6. The bridges include buffers 602 for the cross-path signals, and multiplexers 604 for each of the outgoing signals. A multiplexer 604 for an outgoing signal selects from incoming signals from the other three directions. In the case of the unidirectional bridge 504, one of the incoming signals and one of the outgoing signals is removed. Consequently, the hardware is simplified and a two-input multiplexer 606 can be used. Control signals are provided to the multiplexers 604, 606 to direct the bus signals as desired.

The buffers 602 preferably perform a latching function. In other words, the buffers latch bit signals from input bit lines, and provide the latched bit signals on the output lines on a subsequent clock cycle. This allows the cross-path to be divided into shorter segments that can carry different bit signals concurrently. However, propagation between segments accrues a latency of one clock-cycle per segment. Consequently, it may be desirable to provide some bridges with non-latching buffers to keep the number of segments to a minimum. In this manner, a trade-off between throughput and cross-path latency may be achieved.

It is noted that address paths do not necessarily have uniform bit widths, and consequently, the bit width of the cross-path must be adequate to support the maximum address path bit width. At those junctions where the address path bit width is less than the cross-path bit width, not all of the cross-path bit lines are coupled to the address path bit lines.

Multimedia systems typically have audio, video, administrative, and real-time tasks. The processor units need to trade data back and forth to carry out all these tasks. However, it is noted that these data exchanges are not random or unstructured. Rather, the tasks performed by multimedia systems tend to be well-defined tasks involving known memory sizes and predictable communications paths. If the memory modules will support simultaneous reads and writes, memory access collisions can often be minimized by the software programmer. In the embodiment of FIG. 5, the microcontroller unit is expected to communicate primarily with the DSP, and only rarely directly with the hardware accelerator. Similarly, the hardware accelerator is expected to communicate primarily with the DSP and only rarely with the microcontroller unit. Consequently, the DSP is located on the cross-path between the microcontroller unit and the accelerator. This provides the processor units with a minimal latency when they are accessing their own or "adjacent" memory pages owned by the neighboring processor unit.

As an example of the operation of the cooperative processing operations of the processor array, a video macroblock decoding operation is now described. Microcontroller 104 may be executing an operating system which downloads an encoded video macroblock to the DSP memory (202E) two bytes at a time. The microcontroller 104 then writes a "Start Viterbi Algorithm" mailbox message to the DSP's mailbox (in the first memory page 202A). The DSP 320 receives the message and decodes the video macroblock using the Viterbi algorithm, writing the results to the hardware accelerator's memory (202G). The DSP 320 sends a message to the accelerator's mailbox to start the inverse discrete cosine transform of the decoded macroblock. The accelerator 318 performs the IDCT, writing pixel results to the MCU's memory (202C). Upon completion, the accelerator 318 sends a message to the MCU 104 requesting a transfer of the decoded video block to the video buffer.

Although digital signal processors and hardware accelerators have previously been used together with a microcontroller in multimedia systems, there has been no standardized method for coupling them together which would readily support the addition of more processing units. The disclosed architecture resolves these issues and further provides a logically-mapped shared memory. The author knows of no DSP systems which employ a shared memory architecture. By providing a logically mapped shared memory and standardized interface ports, the disclosed architecture simplifies many programming and system design issues. The disclosed architecture also benefits in terms of scalability from the use of uniform-width data channels and the modularized memory. Finally, the use of page pointers may provide for a way to eliminate critical path issues from the traffic master design, and thereby enable the architecture to "ride the technology curve", i.e. allow systems employing this architecture to be implemented using the newest integrated circuit technology with little or no system re-design.

As an advantage of the ability to scale the system, various system implementations may be designed with various numbers of processing units and/or various traffic master routing efficiencies (i.e. various effective bandwidths to memory) to provide a customer with a customized cost/performance tradeoff.

What is claimed is:

1. A system which comprises:
   a traffic master;
   an array of memory modules, wherein each memory module is coupled to the traffic master by a data channel, wherein each data channel includes an address path and one or more data paths, wherein the data paths have a common number of data lines; and
   an array of processor units each coupled to the traffic master by a data bus to transfer data to and from the memory modules using a shared address space which spans the array of memory modules, wherein the traffic master includes:
a processor interface port for each processor, wherein the processor interface port converts data bus signals into corresponding data channel signals, and also converts data channel signals into corresponding data bus signals;
a router coupled to the processor interface ports to receive the data channel signals and configured to route the data channel signals to the memory modules, wherein the router is further configured to carry requested data channel signals from the memory modules to the processor interface ports;

wherein the array of processor units includes at least one processor unit having a data bus with a number of data lines that exceeds said common number of data lines in the data paths, wherein said common number of data lines is the greatest common divisor (GCD) of the numbers of data lines for the data busses.

2. The system of claim 1, wherein said array of processor units includes a digital signal processor and a hardware accelerator, and wherein the traffic master is further coupled to a microcontroller.

3. The system of claim 1, wherein said array of processor units includes a video controller.

4. The system of claim 1, wherein the memory modules have heterogeneous storage capacities.

5. A system which comprises:
a traffic master;
an array of memory modules, wherein each memory module is coupled to the traffic master by a data channel, wherein each data channel includes an address path and one or more data paths, wherein the data paths have a common number of data lines; and
an array of processor units each coupled to the traffic master by a data bus to transfer data to and from the memory modules using a shared address space which spans the array of memory modules, wherein the traffic master includes:
a processor interface port for each processor, wherein the processor interface port converts data bus signals into corresponding data channel signals, and also converts data channel signals into corresponding data bus signals;
a router coupled to the processor interface ports to receive the data channel signals and configured to route the data channel signals to the memory modules, wherein the router is further configured to carry requested data channel signals from the memory modules to the processor interface ports;
a memory management unit coupled to the processor interface ports to receive address signals, and configured to responsively determine a conflict-free access pattern, wherein the memory management unit is coupled to the router to provide control signals to the router, whereby the router implements the conflict-free access pattern to route data channel signals between the memory modules and the processor interface ports; and
an interrupt control unit coupled to the processor units to provide interrupt signals, wherein the interrupt control unit is configured to assert an interrupt signal if the memory management unit detects a prohibited memory access attempt by a processor unit, wherein the array of processor units includes at least one processor unit having a data bus with a number of data lines that exceeds said common number of data lines in the data paths.

6. The system of claim 5, wherein the memory management unit is configured to coordinate block transfers of data from the memory modules, and wherein the interrupt control unit is configured to assert an interrupt signal to indicate completion of a block transfer.

7. The system of claim 1, further comprising:
a system bus coupled to the traffic master;
a system memory coupled to the system bus; and
a system controller coupled to the system bus, wherein the system controller is configured to perform system administration functions and to operate a user interface.

8. A processing system which comprises:
an array of processor units;
an array of memory units, wherein each memory unit corresponds to a processor unit;
a traffic master which couples each memory unit to a processor unit by a corresponding address bus and a corresponding data bus, wherein the corresponding data bus includes one or more data paths having a common bit-width, wherein the traffic master includes:
one or more data cross-paths which are coupled to corresponding data paths from each of the data busses by a data bridge;
an address cross-bus which couples to each of the address busses by an address bridge; and
a memory management unit coupled to the address busses to receive address signals and coupled to the data and address bridges to route signals between the processor units and the memory units, wherein the array of processor units includes at least one processor unit having a data bus with a bit-width that exceeds said common bit-width of the data paths, and wherein said common bit-width is the greatest common divisor (GCD) of the bit-widths of the data busses.

9. The processing system of claim 8, wherein the traffic manager further includes:
a set of memory configuration registers coupled to the address cross-bus and one or more of the data cross-paths, wherein the memory management unit is further configured to route signals between processor units and the set of memory configuration registers.

10. The processing system of claim 8, wherein the traffic master further comprises an interrupt controller coupled to each of the processor units to provide an interrupt signal.

11. The processing system of claim 10, wherein the memory management unit is further configured to generate address signals and route data signals between memory units to conduct block transfers of data.

12. The processing system of claim 8, wherein the array of processor units includes a digital signal processor and a hardware accelerator.

13. The processing system of claim 12, wherein the array of processor units further includes a system controller.

14. The processing system of claim 8, wherein the common bit-width is eight bits.

* * * * *